United States Patent
Park et al.

(10) Patent No.: US 8,718,131 B2
(45) Date of Patent: May 6, 2014

(54) METHOD AND APPARATUS FOR GENERATING AND PROCESSING PACKET IN MPEG-2 TRANSPORT STREAM

(75) Inventors: Sung-il Park, Suwon-si (KR); Ga-hyun Ryu, Suwon-si (KR); Jong-hwa Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1236 days.

(21) Appl. No.: 12/106,467

(22) Filed: Apr. 21, 2008

(65) Prior Publication Data
US 2009/0245346 A1    Oct. 1, 2009

Related U.S. Application Data

(60) Provisional application No. 60/907,973, filed on Apr. 25, 2007.

(30) Foreign Application Priority Data

Jul. 20, 2007  (KR) .......................... 10-2007-0073122

(51) Int. Cl.
*H04N 7/12*  (2006.01)
(52) U.S. Cl.
USPC .................................................... 375/240.01
(58) Field of Classification Search
USPC .................................................... 375/240.01
IPC ........................................................ H04N 7/12
See application file for complete search history.

(56) References Cited

U.S. PATENT DOCUMENTS

| | | | |
|---|---|---|---|
| 6,026,506 A * | 2/2000 | Anderson et al. | 714/746 |
| 6,452,952 B1 | 9/2002 | Okuhara | |
| 6,477,185 B1 * | 11/2002 | Komi et al. | 370/536 |
| 6,643,452 B1 | 11/2003 | Ohbi | |
| 7,120,924 B1 * | 10/2006 | Katcher et al. | 725/60 |
| 7,174,090 B2 * | 2/2007 | Asamura et al. | 386/330 |
| 2004/0107356 A1 * | 6/2004 | Shamoon et al. | 713/193 |
| 2005/0160345 A1 | 7/2005 | Walsh et al. | |
| 2006/0165182 A1 * | 7/2006 | Kikuchi | 375/240.25 |
| 2009/0052469 A1 * | 2/2009 | Iwase et al. | 370/474 |
| 2009/0279608 A1 * | 11/2009 | Jeon et al. | 375/240.16 |

FOREIGN PATENT DOCUMENTS

| | | |
|---|---|---|
| JP | 2982750 B2 | 9/1999 |
| JP | 2005-72916 A | 3/2005 |
| KR | 1999-0076609 A | 10/1999 |
| WO | 98/18246 A2 | 4/1998 |

OTHER PUBLICATIONS

Communication dated Dec. 12, 2013 issued by the Korean Intellectual Property Office in counterpart Korean Patent Application No. 10-2007-0073122.

* cited by examiner

*Primary Examiner* — Dave Czekaj
*Assistant Examiner* — Tracy Li
(74) *Attorney, Agent, or Firm* — Sughrue Mion, PLLC

(57) ABSTRACT

A method and apparatus for generating and processing a packet are provided. In the method of processing a packet, a packet including main data, an identifier representing the type of the main data, and packet information corresponding to information on other packets that will have the same identifier as the identifier is received, the identifier and the packet information are extracted from the received packet, and the main data is selectively extracted from the packet based on the extracted identifier.

14 Claims, 7 Drawing Sheets

METHOD AND APPARATUS FOR GENERATING AND PROCESSING PACKET IN MPEG-2 TRANSPORT STREAM

CROSS-REFERENCE TO RELATED PATENT APPLICATIONS

This application claims priority from U.S. Provisional Patent Application No. 60/907,973, filed on Apr. 25, 2007, in the U.S. Patent and Trademark Office, and Korean Patent Application No. 10-2007-0073122, filed on Jul. 20, 2007, in the Korean Intellectual Property Office, the disclosures of which are incorporated herein in their entirety by reference.

BACKGROUND OF THE INVENTION

1. Field of the Invention

Methods and apparatuses consistent with the present invention relate to generating and processing a packet, and more particularly, to generating and processing a packet and efficiently filtering the packet.

2. Description of the Related Art

The development of data transmission technology and multimedia technology enables transmission of various kinds of data. In particular, while related art analog broadcasting systems can transmit only restricted text data, digital broadcasting systems can provide audio and/or video (AV) contents such as music and images, TV banking, Internet search functions and so on as well as information services including weather and news.

When receiving AV contents, a user may require all elementary streams included in the received data or parts of the elementary streams. Even in the latter case, it is necessary to decode all packets included in the received data and select required elementary streams.

In the case of wireless data transmission such as digital broadcasting, the probability that data is damaged due to inter-channel interference or noise is high. In order to restore the damaged data, an additional encoding operation such as Reed-Solomon (RS) encoding or outer coding must be carried out. In order to process encoded data, a decoding process corresponding to the encoding process is required. Accordingly, an additional decoding process such as RS decoding or outer decoding should be performed on all received packets in order to judge whether the received packets include elementary streams desired by a user.

As described above, even when the user wants to extract parts of elementary streams, at least identifier (ID) information of all the packets must be extracted, and an additional decoding process for extracting ID information of a packet subjected to encoding for error recovery must be performed, which is inefficient.

SUMMARY OF THE INVENTION

The present invention provides a method and apparatus for generating and processing a packet without decoding an unnecessary packet.

According to an aspect of the present invention, there is provided a method of generating a packet, the method including the operations of receiving main data to be embedded in the packet; generating an identifier representing a type of the main data and packet information corresponding to information on other packets having a same identifier as the identifier; and adding the generated identifier and packet information to the main data so as to generate the packet.

The packet information may correspond to the number of packets which have the same identifier as the identifier of the packet and are continuously transmitted after the packet is transmitted.

The packet may be a moving picture expert group (MPEG)-2 transport stream (TS) packet.

The packet information may be included in an adaptation field region according to MPEG-2 TS standards.

According to another aspect of the present invention, there is provided a method of processing a packet, the method including the operations of receiving at least one packet including a first packet which includes main data, an identifier representing a type of the main data, and packet information corresponding to information on other packets having a same identifier as the identifier of the first packet; extracting the identifier and the packet information from the received first packet; and selectively extracting the main data of the received at least one packet based on the extracted identifier and packet information.

The packet information may correspond to the number of packets which have the same identifier as the identifier of the packet and are continuously transmitted after the packet is transmitted.

The selective extracting of the main data may include the operation of discarding the packet having the same identifier as the extracted identifier from among the received at least one packet based on the packet information when the extracted identifier does not correspond to a predetermined identifier.

The selective extracting of the main data may include the operation of extracting the main data from the packet having the same identifier as the extracted identifier from among the received at least one packet when the extracted identifier corresponds to the predetermined identifier.

The packet may be an MPEG-2 TS packet.

The packet information may be included in an adaptation field region according to MPEG-2 TS standards.

According to another aspect of the present invention, there is provided an apparatus for generating a packet, comprising: a receiver receiving main data to be embedded in the packet; a packet information generator generating an identifier representing a type of the main data and packet information corresponding to information on other packets having a same identifier as the identifier; and a packet multiplexer adding the generated identifier and packet information to the main data so as to generate the packet.

According to another aspect of the present invention, there is provided an apparatus for processing a packet, comprising: a receiver receiving at least one packet including a first packet which includes main data, an identifier representing a type of the main data, and packet information corresponding to information on other packets having a same identifier as the identifier of the first packet; a first extractor extracting the identifier and the packet information from the received first packet; and a second extractor selectively extracting the main data of the received at least one packet based on the extracted identifier and packet information.

The present invention can filter an undesired packet without checking the ID of the packet to omit an additional decoding process required to check the ID of the packet and improve packet processing efficiency.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1:
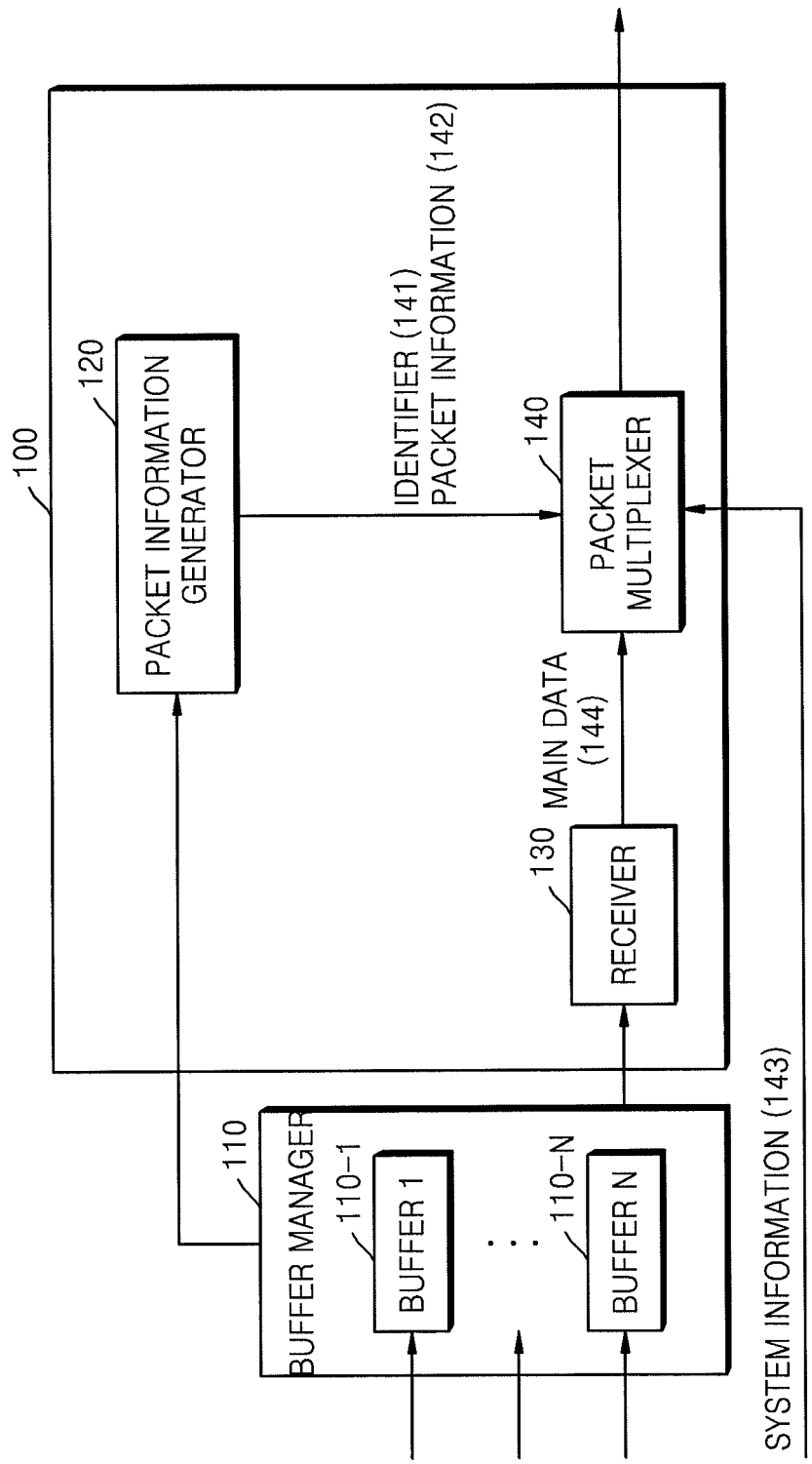
FIG. 1 is a block diagram of a packet generating apparatus 100 according to an exemplary embodiment of the present invention.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those of ordinary skill in the art. Throughout the drawings, like reference numerals refer to like elements.

FIG. 1 is a block diagram of a packet generating apparatus 100 according to an exemplary embodiment of the present invention. Referring to FIG. 1, the packet generating apparatus 100 includes a packet information generator 120, a receiver 130, and a packet multiplexer 140.

A buffer manager 110 manages input/output of data to/from buffers 110-1 through 110-N. The buffer manager 110 can further include a data parser (not shown) which parses input data into audio data, video data and additional information data, and transmits the audio data, the video data and the additional information data to corresponding buffers among the buffers 110-1 through 110-N under the control of the buffer manager 110.

The buffer manager 110 transmits information on the data stored in the buffers 110-1 through 110-N, such as information on the size of the data, to the packet information generator 120. Furthermore, the buffer manager 110 controls main data 144 such that the main data 144 is sent to the receiver 130 from the buffers 110-1 through 110-N. The main data 144 is embedded in a packet to be generated by the packet multiplexer 140.

The packet information generator 120 receives the information on the data from the buffer manager 110, and generates an identifier 141 representing the type of the main data 144 and information 142 on other packets that will have the same identifier as the identifier 141. The information 142 is referred to as packet information hereinafter. For example, the packet information 142 may include information on the number of packets that will have the same identifier as that of a generated packet and are continuously transmitted after the generated packet is transmitted.

The packet information generator 120 may directly analyze the data received at the packet generating apparatus 100 so as to generate the identifier 141 and the packet information 142 without receiving the information on the data from the buffer manager 110.

The receiver 130 receives the main data 144 of the packet from the buffers 110-1 through 110-N. The received main data 144 is transmitted to the packet multiplexer 140 in order to generate the packet.

The packet multiplexer 140 receives the identifier 141 and the packet information 142 from the packet information generator 10, and receives the main data 144 of the packet from the receiver 130. The packet multiplexer 140 generates the packet that includes the identifier 141 for identifying the type of the main data 144, the packet information 142 and the main data 144.

The packet multiplexer 140 may further receive system information 143 from an external device and include the system information 143 in the packet. The system information 143 may include information for analyzing the main data and time information, and it is not limited to specific types of information.

Figure 2A:
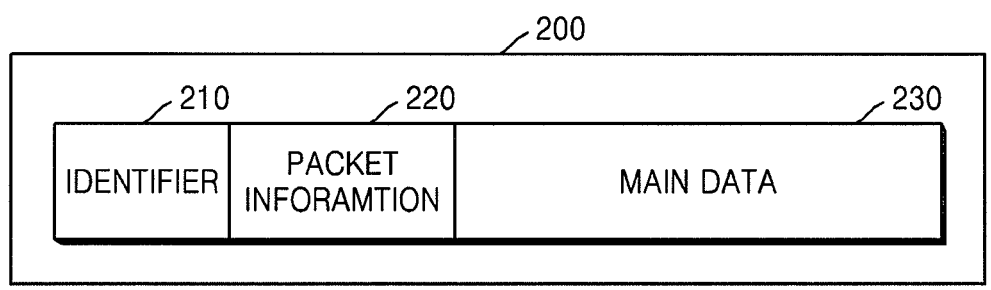
FIGS. 2A and 2B illustrate a packet 200 generated by the packet generating apparatus 100 illustrated in FIG. 1, according to an exemplary embodiment of the present invention.

FIG. 2A illustrates a packet 200 generated by the packet generating apparatus 100 illustrated in FIG. 1. Referring to FIG. 2A, the packet 200 includes an identifier 210, packet information 220, and main data 230. The identifier 210 represents the type of the main data 230, which depends on the contents of the main data 230.

The packet 200 can include at least one identifier. For example, the packet 200 includes two identifiers. In this case, a first identifier may represent the type of the main data 230, and a second identifier identifies respective elementary streams included in packets having the same identifier as the first identifier.

The packet information 220 is information on other packets that will have the same identifier as the identifier 210 of the packet 200. The packet information 220 may include information on the number of packets which have the same identifier as the identifier 210 and are continuously transmitted (or received) after the packet 200 is transmitted (or received).

The packet information 220 can be included in the most significant packet among continuous packets having the same identifier 210. In this case, additional information (not shown) representing whether the packet 200 includes the packet information 200 is required. For example, the packet 200 includes the packet information 220 when the additional information corresponds to '1', and the packet 200 does not include the packet information 220 when the additional information corresponds to '0'.

The main data 230 means data that is transmitted by the packet 200.

The packet 200 according to an exemplary embodiment of the present invention can be constituted by adding the packet information 220 to a related art packet or the packet information 220 can be transmitted using an additional information transmitting period of the related art packet. For example, a moving picture expert group (MPEG)-2 transport stream (TS) data packet can be constituted by embedding the packet information 220 in a private data region in an adaptation field.

Figure 2B:
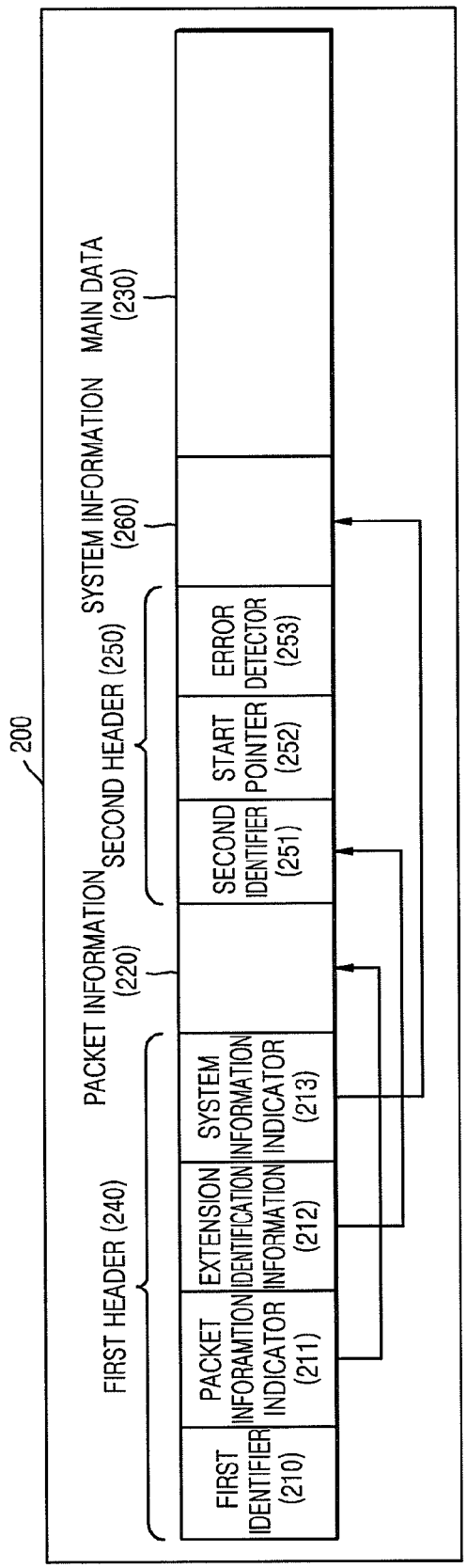

FIG. 2B illustrates a detailed structure of the packet 200 illustrated in FIG. 2A. Referring to FIG. 2B, the packet 200 includes a first header 240, the packet information 220, a second header 250, system information 260, and the main data 230.

The first header 240 includes the first identifier 210, packet information indicator 211, extension identification information 212 and a system information indicator 213. The first identifier 210 represents the type of the main data 230 according to the main data 230. Accordingly, it is assured that packets having the same identifier 210 include related main data 230.

The packet information indicator 211 indicates whether the packet 200 includes the packet information 220. As described above, the packet information 220 can exist in every packet or in parts of packets. The packet information indicator 211 is needed when the packet information 220 exists in parts of the packets. For example, the packet 200 includes the packet information 220 when the packet information indicator 211 is '1' and the packet 200 does not include the packet information 220 when the packet information indicator 211 is '0'.

The extension identification information 212 indicates whether extension information of the first identifier 211 and a second identifier 251 included in the second header 250 exists. For example, when the second identifier 251 is eight (8)-bit data and the extension identification information 212 is '1', the second identifier 251 can identify the packet using 8 bits. When the extension identification information 212 is '0', the second identifier 251 can identify the packet using only three (3) less significant bits.

The system information indicator 213 indicates whether the packet 200 includes the system information 260. For example, the packet 200 includes the system information 260 when the system information indicator 213 is '1', and the packet 200 does not include the system information 260 when the system information indicator 213 is '0'.

The second header 250 includes the second identifier 251, a start pointer 252, and an error detector 253. When packets having the first identifier 210 include a plurality of elementary streams, the second identifier 251 identifies the respective elementary streams. The second identifier 251 can be composed of 8 bits. If the extension identification information 212 included in the first header 240 is '0', five (5) most significant bits can be 0.

The start pointer 252 indicates the start point of data of an upper layer (for example, an encapsulation layer packet). The error detector 253 detects continuous errors when an elementary stream is packetized.

The system information 260 can be additional information for analyzing the main data 230 and time information, and its format is not limited. The main data 230 is transmitted by the packet 200. The main data 230 can be referred to as a payload.

Figure 3:
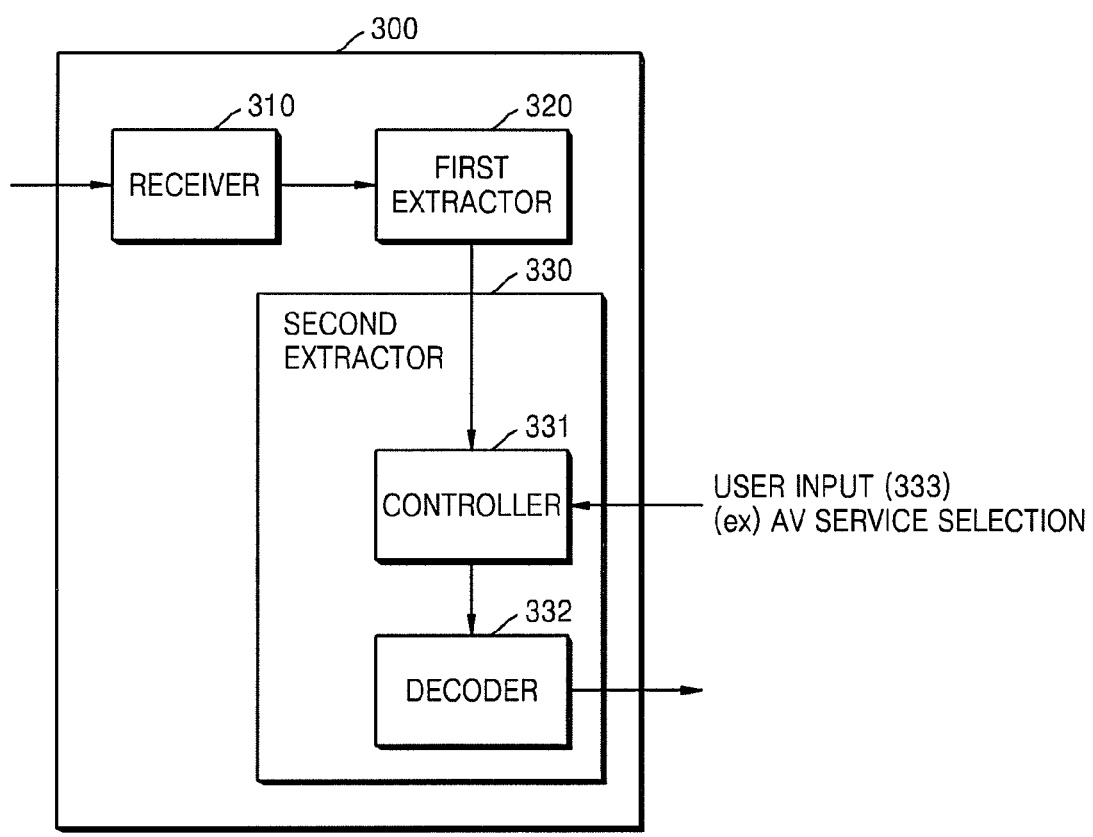
FIG. 3 is a block diagram of a packet processor 300 according to an exemplary embodiment of the present invention.

FIG. 3 is a block diagram of a packet processor 300 according to an exemplary embodiment of the present invention. Referring to FIG. 3, the packet processor 300 includes a receiver 310, a first extractor 320, and a second extractor 330.

The receiver 310 receives at least one packet including a first packet having main data, an identifier representing the type of the main data, and packet information on other packets having the same identifier as that of the first packet. In this case, the first packet includes the identifier and the packet information, and all the packets received by the receiver 310 can include the identifier and the packet information or only parts of the packets can include the identifier and the packet information, as described above.

The receiver 310 can include an additional error corrector (not shown) and, when the received packet is subjected to encoding for error correction, such as RS encoding and outer coding, the receiver 310 performs a decoding process corresponding to the encoding process.

The first extractor 320 extracts the identifier and the packet information from the first packet. The second extractor 330 selectively extracts the main data of the received at least one packet on the basis of the identifier extracted by the first extractor 320.

The second extractor 330 includes a controller 331 and a decoder 332. The controller 331 determines whether the identifier extracted by the first extractor 320 corresponds to a predetermined identifier and controls the decoder 332 according to the determination result. The predetermined identifier can be an identifier of a packet including data that a user (or system) desires, and the controller 331 can receive a user input 333 from an external device.

The decoder 332 receives a control signal from the controller 331 and extracts the main data of the received at least one packet.

For example, when the identifier extracted by the first extractor 320 corresponds to the predetermined identifier, the decoder 332 extracts the main data of the received at least one packet on the basis of the packet information extracted by the first extractor 320. The extracted data can be transmitted to an external output device.

When the identifier extracted by the first extractor 320 does not correspond to the predetermined identifier, the packet having the same identifier as the extracted identifier by the first extractor 320 among the received at least one packet is discarded based on the packet information extracted by the first extractor 320.

Figure 4:
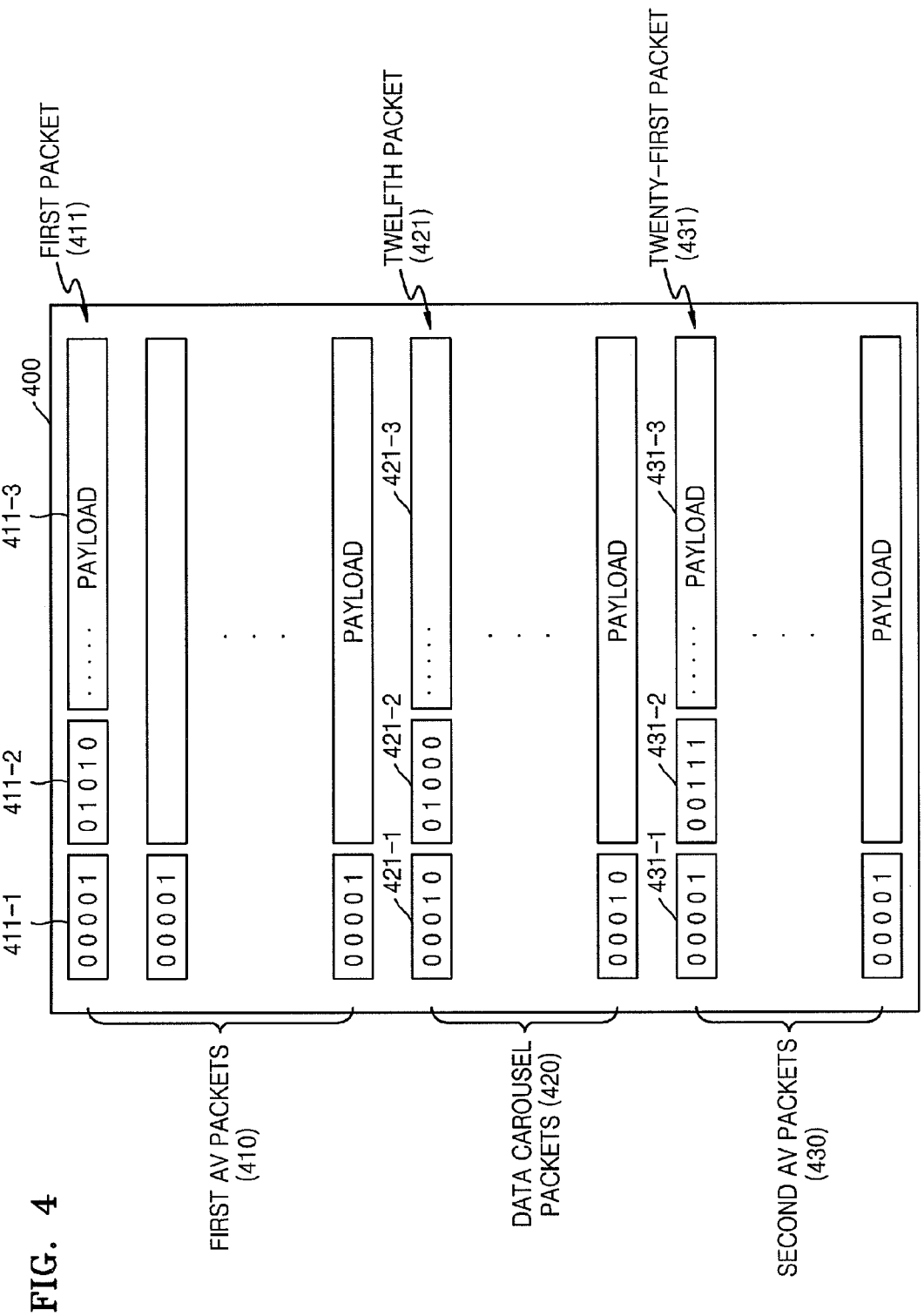
FIG. 4 illustrates a packet processing operation according to an exemplary embodiment of the present invention.

FIG. 4 illustrates a packet processing operation according to an exemplary embodiment of the present invention.

Referring to FIG. 4, received packets include first audio and/or video (AV) packets 410, data carousel packets 420 and second AV packets 430. The packets may include additional information such as a second identifier and a payload pointer for identifying elementary streams of the packets.

When a first packet 411 belonging to the first AV packets 410 is received, an identifier 411-1 and packet information 411-2 are extracted from the first packet 411 to confirm whether the received first packet 411 is a desired packet. When the received first packet 411 is subjected to Reed-Solomon (RS) encoding or outer coding, RS decoding or outer decoding must be performed before the identifier 411-1 of the first packet 411 is extracted.

When a user wants AV data, it is determined whether the received first packet 411 corresponds to AV data. In the current exemplary embodiment of the present invention, it is assumed that the identifiers of packets including AV data correspond to '00001'.

The identifier 411-1 extracted from the first packet 411 is '00001', and thus it is determined that the first packet 411 includes AV data. The packet information 411-2 included in the first packet 411 is information on other packets having the same identifier as the identifier 411-1 of the first packet 411. In the current exemplary embodiment of the present invention, the identifier 411-1 is '00001' and the packet information 411-2 corresponds to information on the number of packets continuously received after the first packet 411.

Referring to FIG. 4, the packet information 411-2 included in the first packet 411 is '01010' which corresponds to the decimal number '10', and thus it is guaranteed that ten (10) AV packets are transmitted after the first packet 411. Accordingly, main data is extracted from each of the ten packets without determining whether the packets include AV data. However, it is possible to determine whether the identifiers of packets correspond to an identifier representing an AV packet for each group of a predetermined number of packets, or to respectively determine whether the identifiers of the respective packets correspond to the identifier representing the AV packet.

After all the packets included in the first AV packets 410 are received, the data carousel packets 420 are received. When a twelfth packet 421 is received, an identifier 421-1 and packet information 421-2 are extracted from the received twelfth packet 421 in order to confirm whether the twelfth packet 421 is a desired packet.

It is determined whether the received twelfth packet 421 includes AV data on the basis of the extracted identifier 421-1. The identifier 421-1 extracted from the twelfth packet 421 is '00010', as illustrated in FIG. 4, and thus the twelfth packet 421 does not include AV data. Accordingly, the main data 421-3 of the twelfth packet 421 is not extracted and the twelfth packet 421 is discarded.

The packet information 421-2 included in the twelfth packet 421 is '01000' which corresponds to the decimal number '8', and thus it is guaranteed that eight packets after the twelfth packet 421 are data carousel packets. Accordingly, the identifiers of the eight packets are not extracted and the eight packets are discarded.

After all the packets belonging to the data carousel packets 420 are received, the second AV packets 430 are received. When a twenty-first packet 431 is received, an identifier 431-1 and packet information 431-2 are extracted from the received twenty-first packet 431 in order to confirm whether the twenty-first packet 431 is a packet including AV data.

It is determined whether the received twenty-first packet 431 includes AV data on the basis of the extracted identifier 431-1. The identifier 431-1 extracted from the twenty-first packet 431 is '00001', as illustrated in FIG. 4, and thus the twenty-first packet 431 includes AV data. Accordingly, the main data 431-3 of the twenty-first packet 431 is extracted.

The packet information 431-2 included in the twenty-first packet 431 is '00111' which corresponds to the decimal number '7', and thus it is guaranteed that seven (7) packets after the twenty-first packet 423 include AV data. Accordingly, main data is extracted from each of the seven packets without determining whether the seven packets include AV data.

Figure 5:
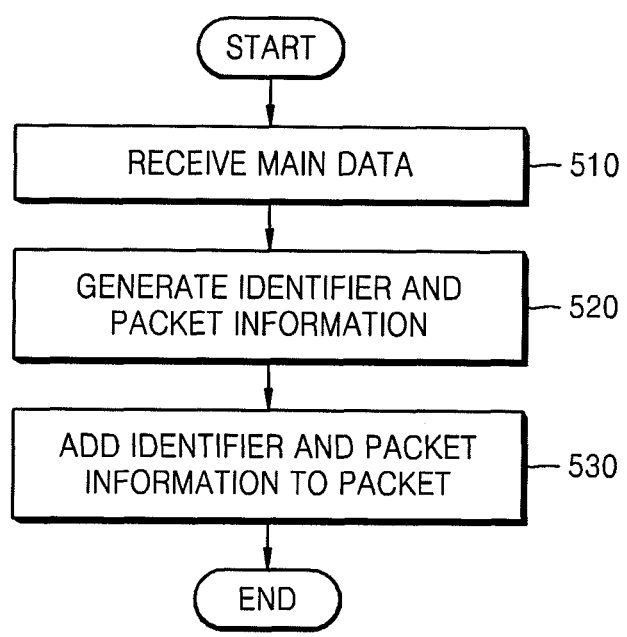
FIG. 5 is a flow chart of a packet generating method according to an exemplary embodiment of the present invention.

FIG. 5 is a flow chart of a packet generating method according to an exemplary embodiment of the present invention. Referring to FIG. 5, main data which is to be embedded in a packet is received in operation 510. An identifier representing the type of the main data and information on other packets that will have the same identifier as the identifier (packet information) are generated in operation 520. The packet information may correspond to information on the number of packets which have the same identifier as that of the to-be-transmitted packet and are continuously transmitted after the packet is transmitted.

The generated identifier and packet information are added to the main data to generate the packet. It is preferable, but not necessary, that packets having the same identifier are continuously transmitted.

Figure 6:
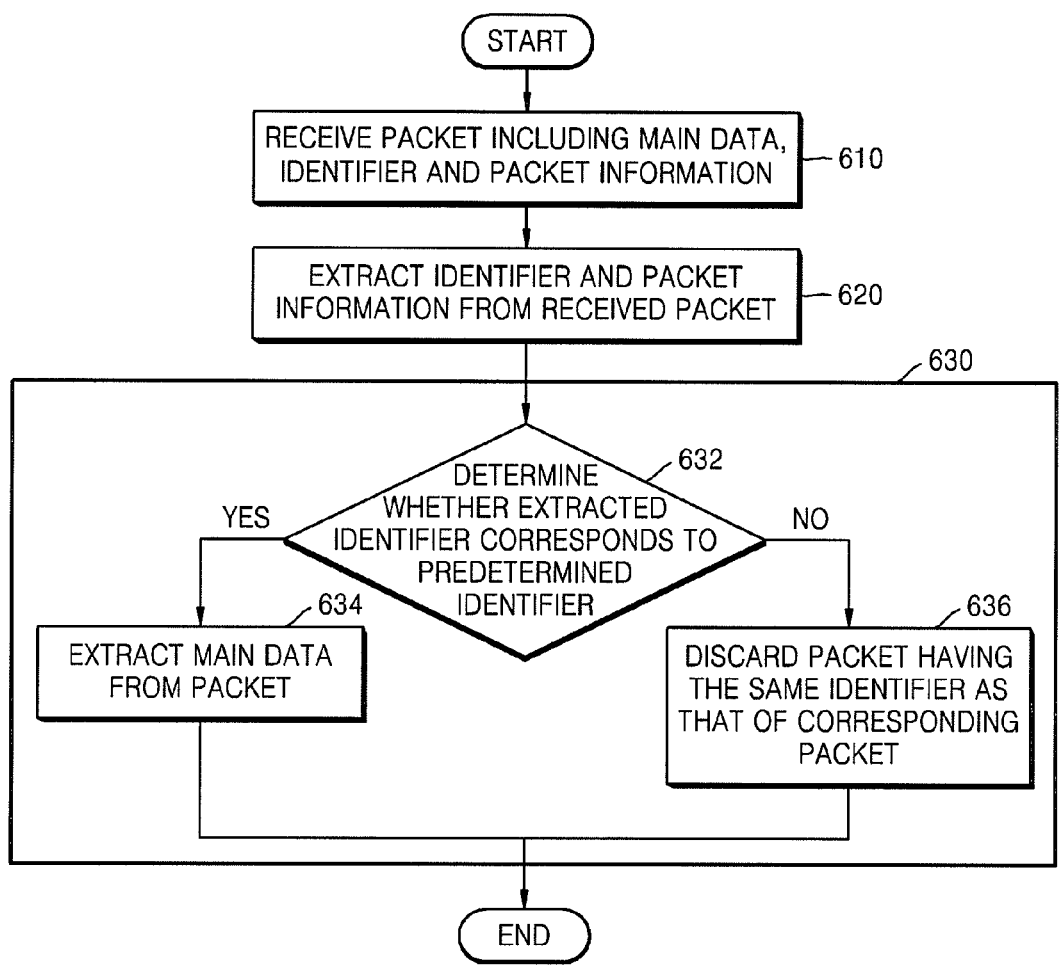
FIG. 6 is a flow chart of a packet processing method according to an exemplary embodiment of the present invention.

FIG. 6 is a flow chart of a packet processing method according to an exemplary embodiment of the present invention. Referring to FIG. 6, at least one packet including a first packet which has main data, an identifier representing the type of the main data, and information on other packets having the same identifier as that of the first packet (packet information) is received in operation 610. The packet information may correspond to information on the number of packets which have the same identifier as that of the first packet and are continuously received after the first packet is received. For example, when the identifier of the first packet is '00001', the packet information included in the first packet is '2' if the identifiers of second and third packets continuously received after the first packet is received correspond to '00001' and the identifier of a fourth packet is '00010'.

However, the packet information is not limited to the number of packets, and it can be information on the position of a finally received packet from among continuously received packets having the same identifier.

The identifier and the packet information are extracted from the first packet in operation 620. The identifier and the packet information of a packet may be located in the header of the packet. In this case, the identifier and the packet information can be extracted from the packet by decoding only the header of the packet. However, when received data is subjected to RS encoding or outer coding for error correction, RS decoding or outer decoding corresponding to the RS encoding or outer coding must be performed.

The main data of the received at least one packet is selectively extracted on the basis of the extracted identifier and packet information from the first packet in operation 630. Specifically, it is determined whether the extracted identifier from the first packet corresponds to a predetermined identifier in operation 632. The predetermined identifier can be an identifier corresponding to a type of the main data that a user desires or an identifier corresponding to a type of the main data required by a system.

When the extracted identifier from the first packet corresponds to the predetermined identifier, the main data of the packet having the same identifier as the extracted identifier among the received at least one packet is extracted in operation 634. When the extracted identifier from the first packet does not correspond to the predetermined identifier, the main data of the packet having the same identifier as the extracted identifier among the received at least one packet is not extracted but discarded in operation 636.

For example, when the identifier of the first packet is '00001' and the packet information is '2', which means that the number of packets continuously received after the first packet is received is '2', it is determined that the main data of the first packet does not correspond to data that a user (or system) wants and the first packet is discarded without extracting the main data from the first packet if the identifier of a packet that the user (or system) desires is '00010'. Furthermore, second and third packets continuously received after the first packet is received are discarded without determining whether the identifiers of the second and third packets correspond to '00010'.

The present invention can also be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The transmission medium can include carrier waves transmitted through the Internet or various types of communication channel. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing a packet, the method comprising:

receiving a packet including main data, a first identifier representing a type of the main data, at least one elementary stream, packet information that indicates a number of other packets having same identifiers as the first identifier after the packet in a transport stream, and a second identifier that identifies the at least one elementary stream;

extracting the first identifier, the packet information, and the second identifier from the packet;

determining whether the first identifier corresponds to a predetermined identifier; and controlling a decoder to extract the main data from the packet and the at least one elementary stream identified by the second identifier in response to determining that the first identifier corresponds to the predetermined identifier, and to discard the packet and discard the number of other packets in the transport stream in response to determining that the first identifier does not correspond to the predetermined identifier.

2. The method of claim 1, further comprising: performing at least one of a Reed-Solomon (RS) decoding and an outer decoding, before controlling the decoder to extract the main data.

3. The method of claim 1, wherein the packet further comprises a start pointer indicating a start position of each of the at least one elementary stream, the method further comprises extracting the start pointer, and the controlling comprises controlling the decoder to extract the at least one elementary stream based on the start pointer.

4. The method of claim 1, wherein the packet further comprises an error marker representing whether there is an error in the packet, the method further comprises extracting the error marker, and the controlling comprises controlling the decoder to discard the packet if the error marker indicates there is an error in the packet.

5. A method of generating a packet, the method comprising:

receiving main data and at least one elementary stream to be embedded in the packet, and main data to be embedded in a number of other packets after the packet in a transport stream;

generating a first identifier representing a type of the main data, packet information that indicates a number of the other packets having same identifiers as the first identifier after the packet in the transport stream, and a second identifier that identifies the at least one elementary stream, the first identifier indicating to a decoder that receives the packet to extract the main data and the elementary stream identified by the second identifier from the packet or discard the packet and discard the number of other packets in the transport stream indicated by the packet information; and generating the packet including the main data, the first identifier, the at least one elementary stream, the packet information, and the second identifier.

6. The method of claim 5, further comprising: performing at least one of a Reed-Solomon (RS) decoding and an outer decoding with respect to the main data.

7. The method of claim 5, wherein the method further comprises receiving a start pointer representing a start position of each of the at least one elementary stream, and the generating the packet comprises generating the packet to include the start pointer.

8. An apparatus for processing a packet, the apparatus comprising:

a receiver configured to receive a packet including main data, a first identifier representing a type of the main data, at least one elementary stream, packet information that indicates a number of other packets having same identifiers as the first identifier after the packet in a transport stream, and a second identifier that identifies the at least one elementary stream;

a first extractor configured to extract the first identifier, the packet information, and the second identifier from the packet; and a second extractor configured to determine whether the first identifier corresponds to a predetermined identifier and control a decoder to extract the main data from the packet and the at least one elementary stream identified by the second identifier in response to determining that the first identifier corresponds to the predetermined identifier, and to discard the packet and discard the number of other packets in the transport stream in response to determining that the first identifier does not correspond to the predetermined identifier.

9. The apparatus of claim 8, wherein the first extractor performs at least one of a Reed-Solomon (RS) decoding and an outer decoding with respect to the packet.

10. The apparatus of claim 8, wherein the packet further comprises a start pointer representing a start position of each of the at least one elementary stream, the first extractor further configured to extract the start pointer, and the second extractor further configured to control the decoder to extract the at least one elementary stream based on the start pointer.

11. The apparatus of claim 8, wherein the packet further comprises an error marker representing whether there is an error in the packet, the first extractor further configured to extract the error marker, and the second extractor further configured to discard the packet if the error marker indicates there is an error in the packet.

12. An apparatus for generating a packet, the apparatus comprising:

a receiver configured to receive main data and at least one elementary stream to be embedded in the packet, and main data to be embedded in a number of other packets after the packet in a transport stream;

a first generator configured to generate a first identifier representing a type of the main data, packet information that indicates a number of the other packets having same identifiers as the first identifier after the packet in the transport stream, and a second identifier that identifies the at least one elementary stream, the first identifier indicating to a decoder that receives the packet to extract the main data and the elementary stream identified by the second identifier from the packet or discard the packet and discard the number of other packets in the transport stream indicated by the packet information; and a second generator configured to generate the packet including the main data, the first identifier, the at least one elementary stream, the packet information, and the second identifier.

13. The apparatus of claim 12, further comprising a coding performing unit performing at least one of a Reed-Solomon (RS) decoding and an outer decoding with respect to the packet.

14. The apparatus of claim 12, wherein the first generator further is further configured to generate a start pointer representing a start position of each of the at least one elementary stream, and the second generator is further configured to generate the packet to further include the start pointer.

* * * * *